Figure 1:
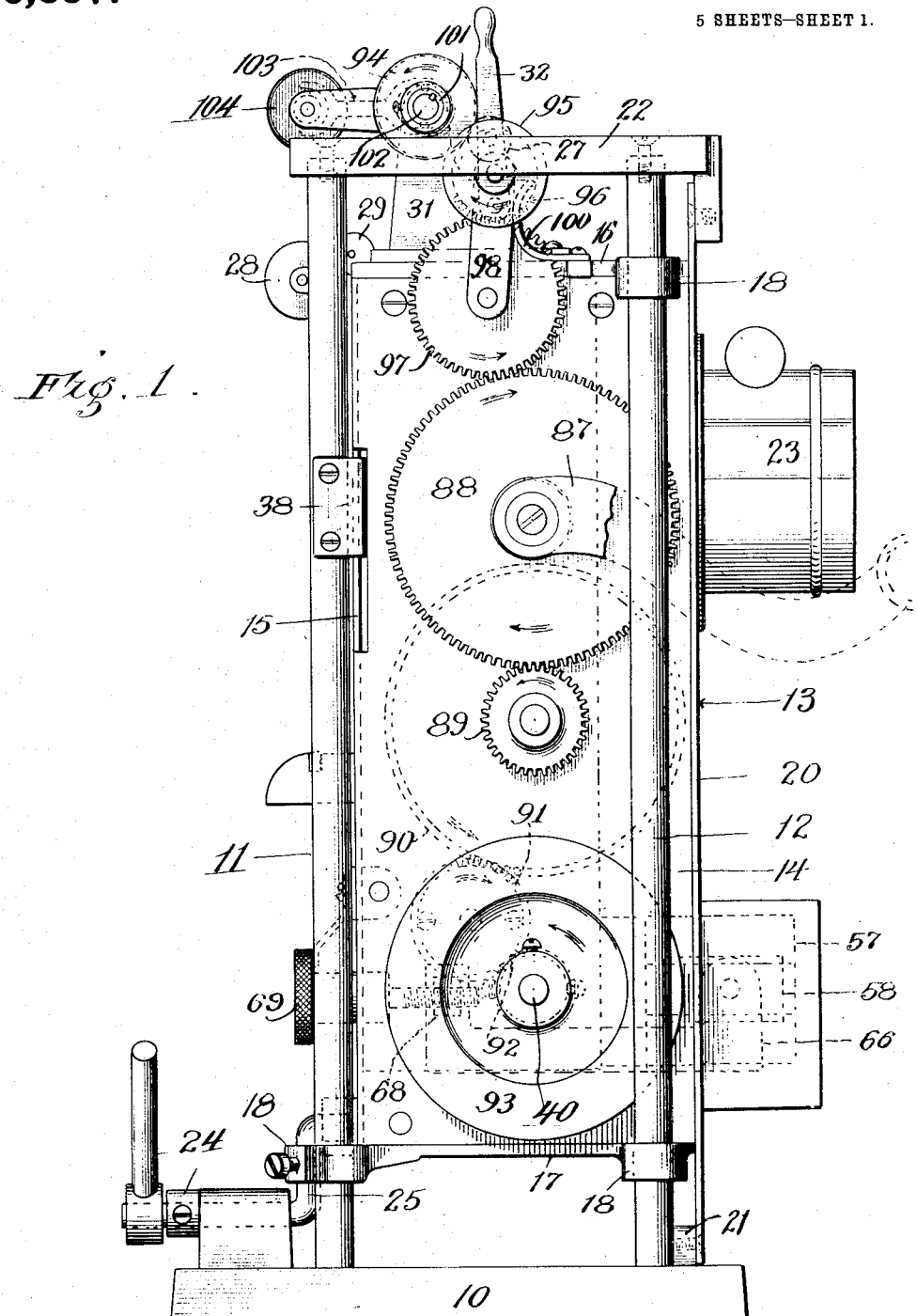

J. J. PINK.
MACHINE FOR TAKING AND EXHIBITING PICTURES.
APPLICATION FILED MAR. 5, 1909.

986,857.

Patented Mar. 14, 1911.

5 SHEETS—SHEET 3.

Witnesses:
Fannie F. Richards
Frank W. Bemm

Inventor:
John J. Pink,
by Charles O. Shurvey
his Atty

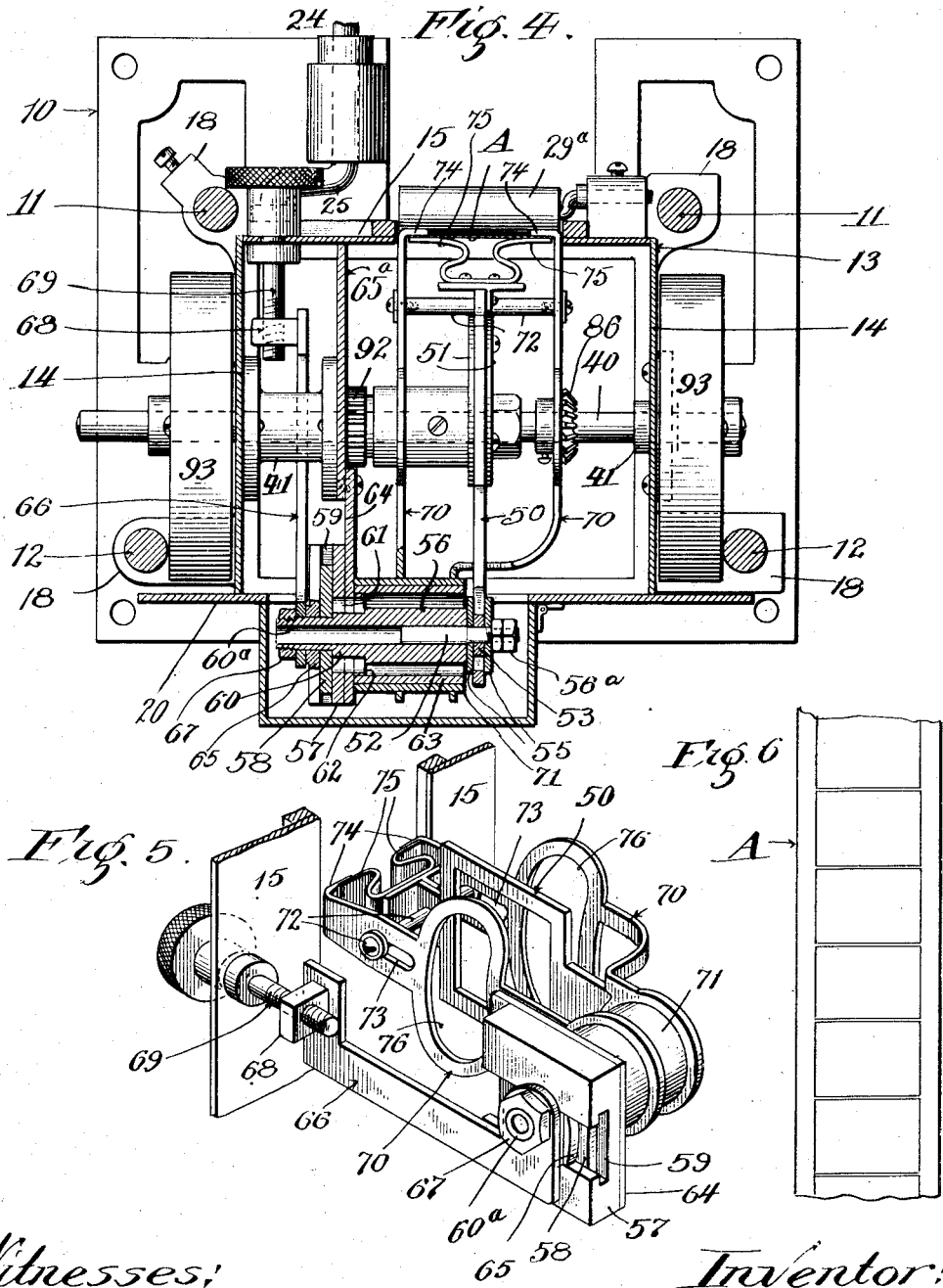

J. J. PINK.
MACHINE FOR TAKING AND EXHIBITING PICTURES.
APPLICATION FILED MAR. 5, 1909.
986,857.
Patented Mar. 14, 1911.
5 SHEETS—SHEET 5.
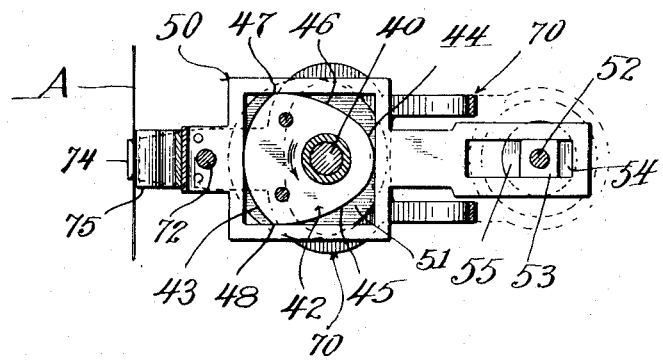
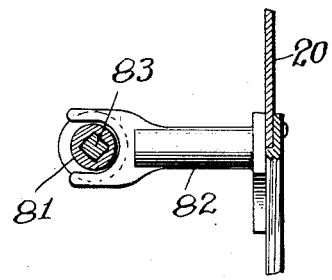
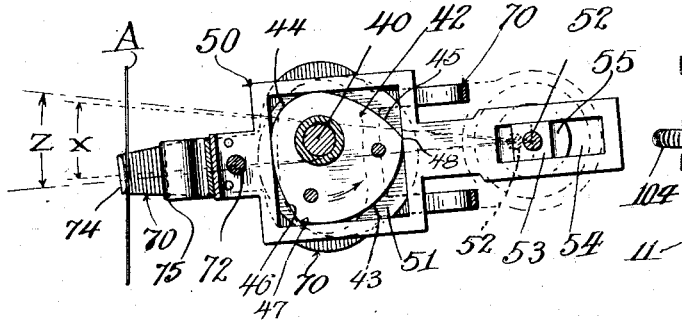
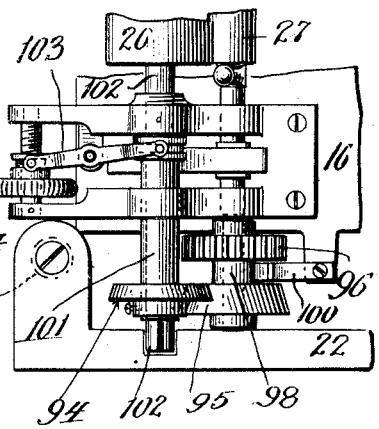
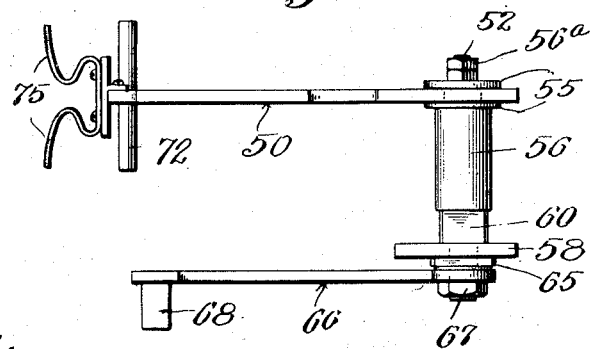
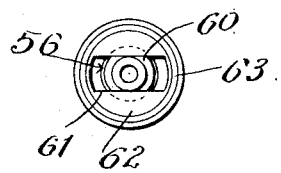
Witnesses:
Fannie F. Richards
Frank W. Bemm
Inventor:
John J. Pink,
by Charles O. Hervey
his Atty

UNITED STATES PATENT OFFICE.

JOHN J. PINK, OF CHICAGO, ILLINOIS.

MACHINE FOR TAKING AND EXHIBITING PICTURES.

986,857.  Specification of Letters Patent.  Patented Mar. 14, 1911.

Application filed March 5, 1909. Serial No. 481,298.

*To all whom it may concern:*

Be it known that I, JOHN J. PINK, a citizen of the United States, residing at Chicago, in the county of Cook and State of Illinois, have invented new and useful Improvements in Machines for Taking and Exhibiting Pictures, of which the following is a specification.

This invention relates to that class of machines especially designed for use in taking and displaying what are commonly known as "moving pictures". It is well known that in order to obtain the best results, machines of this character should have a positively operating mechanism for feeding the film to bring the successive pictures into register with the light aperture, and the operating devices should be properly timed so as to cut off the light during the period that each picture is being moved into position to be projected. When the apparatus is used in taking the pictures, the operating devices should act to bring the sensitive film into register with the light aperture and cut off the light in the same manner.

One of the objects of this invention is to produce a machine in which an imperforate film or ribbon may be used, and which shall insure a positive and reliable feed to such film or ribbon so as to properly bring the successive pictures into the line of projection; to positively and effectually cut off and renew the light at the proper time; to provide means for accommodating the feeding mechanism to films which have shrunk on account of their age; to prevent the danger of ignition of the film caused by the intense heat of the light which is projected from the lamp, and to otherwise improve upon machines of this type.

To such ends this invention consists in certain novel features of construction, arrangements and combinations of parts, a description of which will be set forth in the following specification and the essential features of which will be more particularly defined in the claims.

The invention is illustrated in the drawings furnished herewith in which—

Figure 2:
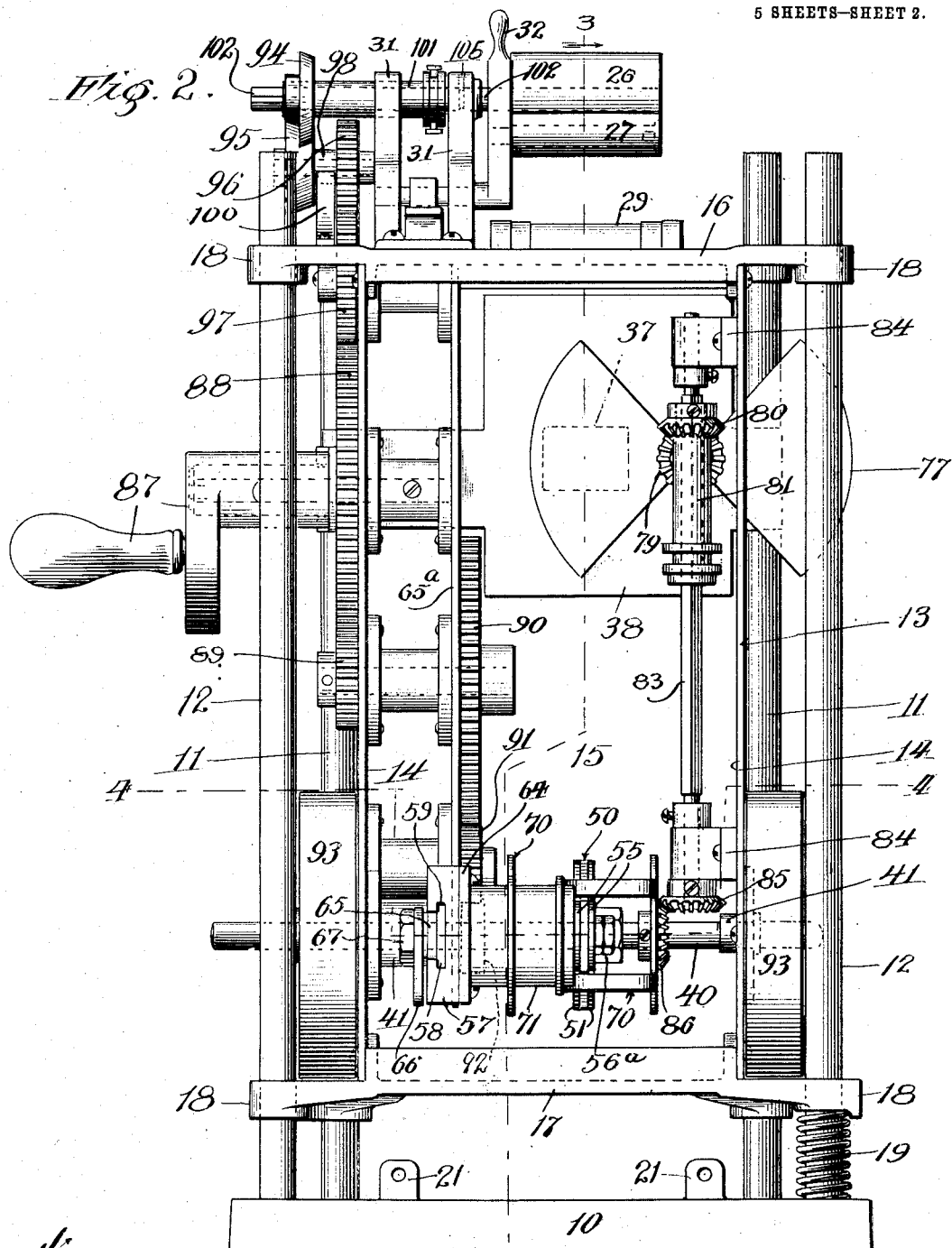
Figure 3:
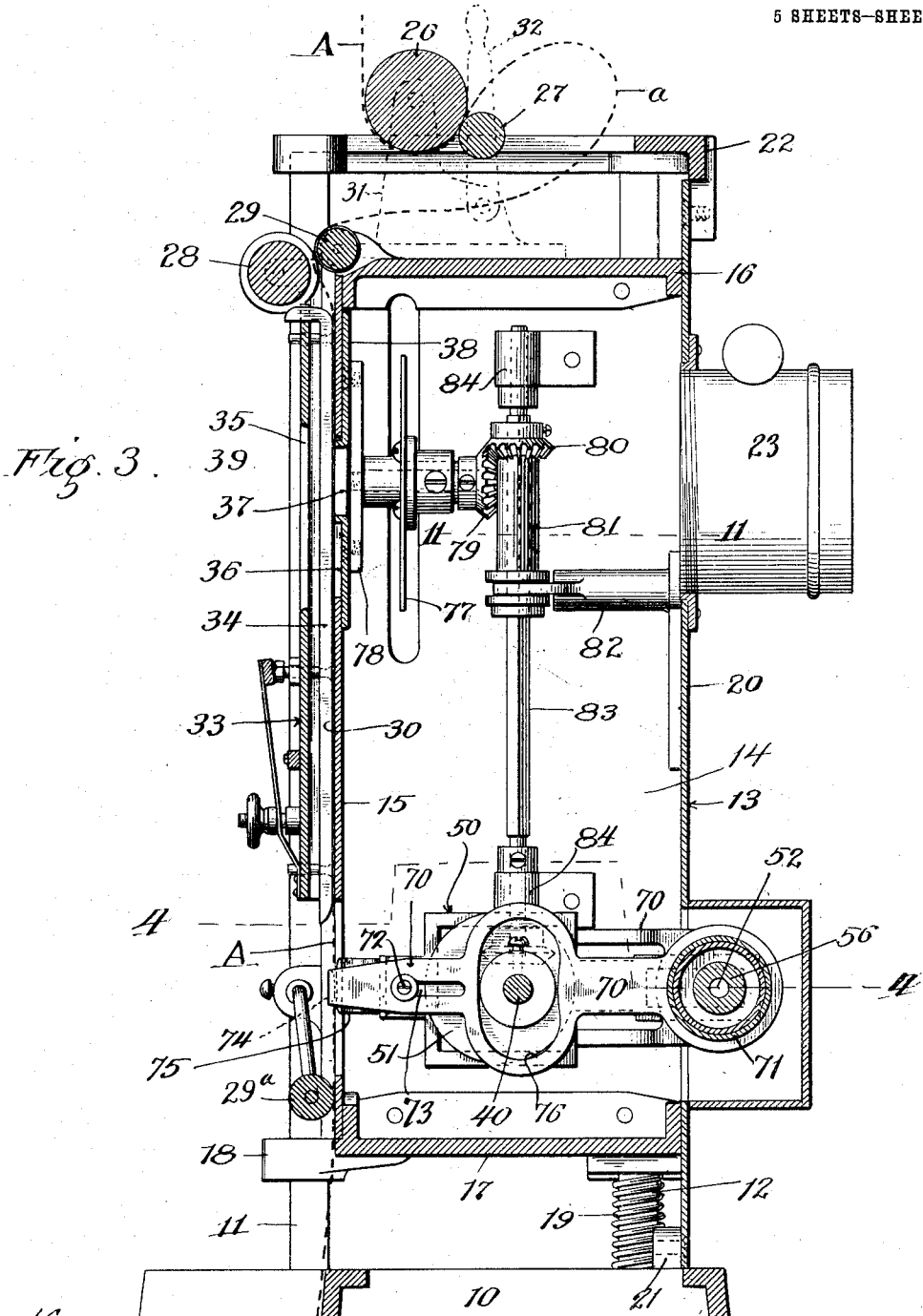

Figure 1 is a side view of a machine embodying my improvements, Fig. 2 is a front view of the machine with the front plate and parts connected therewith, removed so as to illustrate parts which would otherwise be hidden from view, Fig. 3 is a vertical cross section taken on the line 3—3 of Fig. 2, Fig. 4 is a horizontal section taken on the line 4—4 of Figs. 2 and 3, Fig. 5 is a perspective view of part of the film feeding mechanism, Fig. 6 is a face view of a fragment of the film or ribbon, Fig. 7 is a detail side view partly in vertical section of the film feeding mechanism, Fig. 8 is a similar view thereof showing the parts in a different position, Fig. 9 is a plan view of a cam plate and certain connections of the film feeding mechanism, Fig. 10, is an end view of a certain bearing mechanism, which is incorporated in the film feeding mechanism, Fig. 11 is a detail view of a support, the view being partly in plan and partly in horizontal section, and the line of section being indicated in line 11—11 in Fig. 3, and Fig. 12 is a detail fragmental plan view of a certain speed changing mechanism for the feed roller.

In these views 10 represents a base plate, from which rises a plurality of posts 11, 12, that carry the operating mechanism of the machine. The greater part of said mechanism is contained within a box 13, preferably constructed of sheet metal sides 14, a rear wall 15, a top 16, and a bottom 17. The top and bottom are preferably provided with ears or lugs 18, which encircle the posts 11, 12, thereby providing a sliding connection between the box and the posts. If desired a coil spring may be employed for yieldingly supporting the box and such a spring is shown at 19. The front of the box is closed by a front plate 20, which in this instance is shown as stationarily mounted upon the base 10, ears 21, being provided upon the base to which the plate 20, is secured. The upper end of the plate 20, is fastened to a yoke shaped top frame 22, which is secured upon the upper ends of the posts 11, 12, thereby connecting them and providing a perfectly rigid frame work for carrying the box and operating mechanism.

The lens 23, is secured upon the front plate 20, and may be of any of the well known forms of lenses used in machines of this type.

The box and mechanism carried thereby may be raised and lowered to frame the pictures by means of a lever 24, which is shown as journaled upon the base and connected with the box by a crank arm 25.

The film A, is usually contained within a magazine (not shown) and is threaded between a feed roller 26, and a pressure roller 27, rotatively supported upon the top 16. The film is threaded to pass between the rollers in the manner indicated in Fig. 3, and then brought around to form a loop $a$, which projects toward the front of the machine and consequently away from the lamp from which is derived the source of light. The film is then threaded in between two idle guide rollers 28, 29, down through a channel or guideway 30, where it passes by the light aperture, thence through the film feeding mechanism, from which it passes out between an idler $29^a$, and the lower end of the machine and into any suitable receptacle provided therefor.

The peculiar arrangement of the guide rollers at the top of the machine feeds the loop away from the light aperture and toward the lens side of the machine in such manner that the loop is prevented from falling into the light field between the light aperture and lens. Whenever the film becomes wedged in the passage 30, or in any other manner fails to properly feed through said passage and the operator still continues to run the machine for an instant, the loop will continue to feed, but out of the danger zone, thereby avoiding danger of becoming ignited from the intense heat of the concentrated rays of light transmitted from the lamp.

The feed roller 26, is journaled in brackets 31, and the pressure roller 27, is carried by an arm 32, which is pivotally mounted on the brackets 31, and spring pressed to force the roller 27, into frictional contact with the roller 26. The roller 29, is shown as journaled upon the top 16, of the machine and the roller 28, is journaled upon the door 33, which is hinged to the rear wall 15, of the box 13. This door has the usual pressure shoes 34, that bear upon the film and hold the same in a straight line while it is passing through the channel 30. Light apertures 35, 36, are provided in the door 33, and rear wall 15, of the box, respectively, and a framing aperture 37, is provided in a plate 38, which is stationarily mounted upon posts 11. The framing aperture 37, and lens 23, are in alinement with each other and the box may be raised and lowered by means of the lever 24, to bring the pictures into register with the framing aperture 37.

The form of mechanism thus far described, represents one upon which my present improvements may be used, and with the exception of the arrangement of the feed roller, pressure and idle rollers, may have any suitable form of arrangement, although the type illustrated is a very simple form of construction adapted for use in connection with my present improvements.

The mechanism for intermittently feeding the film past the light apertures is best illustrated in Figs. 2 to 8, inclusive, and will now be described.

A cam shaft 40 is journaled in bearings 41, which may be secured to the side walls of the box, if desired, and said cam shaft carries a cam 42, which is arranged to actuate the film feeding mechanism. As shown in Figs. 7 and 8, said cam has two concentric bearing surfaces 43, 44, and two eccentric bearing surfaces 45, 46, connecting said concentric bearing surfaces. The surface 43, has a greater radius than the surface 44, and the surfaces 45, 46, are struck from points 47, 48, located at the ends of the concentric surface 43. The extent of the concentric surfaces and their differences in radius is so proportioned that the cam will impart to the cam plate 50, the necessary movement to feed standard sized film through the required distance to bring each picture into register with the light aperture 37.

The cam plate 50, is associated with the cam 42, and contains mechanism which coöperates with oscillatory arms 70, in feeding the film. Said plate 50, contains a square aperture, the four inner edges of which engage with the cam 42, at four different points upon its working surfaces. Rotation of this cam in the direction indicated by the arrow, has the effect of oscillating said cam plate through a given arc and reciprocating it longitudinally of itself and transversely of the film. The cam plate 50 is held against lateral movement upon the cam by means of two retaining plates 51, which are secured to the cam and rotate therewith.

In a machine which operates upon imperforate films it is exceedingly important that regulating mechanism be provided for varying the extent of throw of the film feeder inasmuch as the film shrinks from age. It is also important that the film feeding mechanism move the film in a positive and direct movement, regardless of the variation in size. I have overcome these difficulties by providing a movable fulcrum for the feeding mechanism in connection with suitable film gripping devices. The cam plate 50, is slidably fulcrumed upon a pin 52, which pin is adjustably supported so that it may be moved toward or away from the cam shaft 40, and thereby vary the position of the fulcrum of the cam plate 50 with respect to the shaft 40, consequently increasing or decreasing the extent of the arc through which the cam plate is oscillated. In Fig. 8 the extent of throw which the cam plate receives when the fulcrum is in the position indicated in full lines, is illustrated by the dotted lines and arrows $x$, and the extent of the throw which is given to the cam plate when the fulcrum is moved to the position indicated in dotted lines is shown by the dotted lines and arrows $z$. A slide block 53, is preferably mounted upon the pin 52, and slides in a slot 54, formed in the fulcrumed end of the cam plate 50, and provides a sliding connection between the plate and fulcrum pin 52. Guide plates 55, are preferably provided on either side of the block 53, which plates bear against the sides of the cam plate 50. The plates and block are secured upon a reduced portion of the pin 52, by means of nuts 56ª, threaded upon the end of said reduced portion. The pin 52, is shown as journaled in a bearing block 56, which is slidingly supported in a guide block 57, as by a slide 58, which slides in a guideway 59, formed in said block 57. The bearing block 56, has a flattened portion 60 which slides back and forth in a horizontal guideway 61 formed in a block 62, that is secured within a cylindrical bearing 63, which is fastened to a plate 64. The plate 64, is supported in the box 13, as for instance by means of the vertical partition 65ª, and the plate 64, bearing 63, block 62, and guide block 57, are all rigidly secured together as for instance by brazing them together. The guideway 61, may extend through the block 62, the plate 64, and guide blocks 57, and the flattened portion 60, of the bearing block 56, may extend out from the guideway and abutt against the slide 58. A screw threaded neck 60ª, projects from the flattened portion 60, and a washer 65, is placed on the outside of the slide 58, and a link 66, secured upon the outer end of the nack 60ª, by means of a nut 67. In this manner the link, washer, slide and bearing block are rigidly secured together. The link 66, extends toward the rear of the machine and carries a block 68, which is formed with a screw threaded aperture through which extends an adjustment screw 69. The adjustment screw is rotatably seated in the rear wall 15, of the box and has a knurled head, by means of which it may be turned to move the link, bearing block and fulcrum pin in a line toward or away from the film. The fulcrum pin is preferably placed in a line extending transversely of the film and passing through the axis of rotation of the cam. By moving the fulcrum pin toward the cam shaft the cam plate will be oscillated through a greater arc than when the fulcrum pin is further removed from the cam shaft and the film will therefore be drawn down more or less according to the position of the fulcrum. It will therefore be understood that when a film is used in which the pictures are smaller and closer together than in the standard size, or the film has shrunk so as to make the pictures smaller and closer, the fulcrum pin may be moved away from the cam shaft thereby decreasing the arc through which the feeder oscillates until its movement corresponds with the distance through which the film should be moved to bring each picture into register with the light aperture.

Associated with the cam plate 50, are oscillating arms 70, which are fulcrumed upon the cylindrical bearing 63. The fulcrumed ends of the arms 70, are secured upon a sleeve 71, which encircles the cylindrical bearing and the forward ends of the arms are guided to move upon posts 72, that project out from the sides of the cam plate 50. Slots 73, are provided in the arms 70, in which the posts travel in a forward and backward movement. The oscillatory motion of the cam plate is transmitted to the arms 70, through the posts 72, but the reciprocatory motion of the cam plate is not transmitted by reason of the fact that the posts slide in the slot 73, of the arm. The front ends of the arms are provided with fingers 74, which are arranged to engage with the outer face of the film and the cam plate is provided with fingers 75, that engage with the inner face of the film, the two sets of fingers acting to grasp the film between them whenever the cam plate is moved toward the film. One of the sets of fingers should have a spring incorporated therewith, so that considerable tension may be had upon the film to insure a perfect grip thereon. In the form shown, the fingers 75, are bent up from a piece of spring metal having reverse curves therein which form the spring for the fingers. The arms extend across the cam shaft and are provided with slots 76, which encircle the cam shaft and permit the arms to oscillate about the same.

The light shutter is seen at 77, and is of the ordinary revolving form. It is journaled upon a plate 78, and carries a miter pinion 79, which meshes with a miter pinion 80, fast upon a sleeve 81. Said sleeve is supported in place by a post 82, which is secured upon the stationary front wall 20. The sleeve revolves in said post, and contains a non-circular opening in which slides a non-circular shaft 83. The shaft contains circular ends which are journaled in bearings 84, secured to one of the side walls of the box 13. This sliding connection between the shaft and sleeves permits the box to be raised and lowered without disconnecting the miter pinions 79, 80. The lower end of the shaft 83, carries a miter pinion 85, which meshes with a miter pinion 86, upon the cam shaft 40. It will be readily understood from the above that rotation of the cam shaft causes rotation of the shutter in unison therewith.

The cam shaft is shown as driven from a crank 87, by means of a train of gearing comprising gears 88, 89, 90, 91 and 92, and the cam shaft preferably has secured upon it a pair of fly wheels 93.

The feed roller 26, is geared to one of the gear wheels in the train of gears above referred to, and as shown, this gearing comprises friction disks 94, 95, a pinion 96, fast upon the shaft of the friction disk 95, and a gear wheel 97, meshing with the pinion 96, and with the gear 88. The friction disk 95 and gear 96, are carried by an arm 98, which is fulcrumed on the shaft of the gear wheel 97, and a spring 100, is arranged to bear against said arm and hold the friction disk 95, in continuous engagement with the friction disk 94. The contacting peripheries of the friction disks 94, 95, are beveled so that by moving one across the periphery of the other, the speed of one disk will vary according to the relative diameters of the contacting peripheries. The friction disk 94, is fast upon a sleeve 101, which is feathered to the shaft 102, of the feed roller 26, and slides thereon. The sleeve has a grooved collar upon one end which is engaged by a forked lever 103, which is actuated by an adjustment wheel 104. By moving the adjustment wheel the sleeve and friction disk 94, may be moved to vary the speed of the pressure roller. Longitudinal movement of the shaft 102, may be prevented by any suitable means, as for instance a pin 105, may project into an annular groove formed in the shaft.

The mechanism just described forms a simple means for varying the speed of the feed roller 26, and whenever it is necessary to vary the throw of the feeder, the speed of the feed roller 26, may be changed to correspond with the movement of the feeder. In this way the feed roller 26, always feeds the right amount of film to the feeder.

The operation of the various parts has been set forth in the specification and will be understood from the above description.

I am aware that various alterations and modifications of the details of construction are possible without departing from the spirit of my invention, and I do not therefore desire to limit myself to the exact construction and arrangement shown and described.

I claim as new and desire to secure by Letters Patent:

1. In a device of the class described, the combination of an oscillatory film feeder, having relatively movable film gripping fingers, a rotary feeder-actuating cam engaging with said feeder and operating to positively oscillate the feeder and open and close the fingers upon the film, and a fulcrum for said feeder.

2. In a device of the class described, the combination of an oscillatory film feeder comprising two elements, each of which carries film gripping fingers, a cam constructed and arranged to positively oscillate the feeder and reciprocate one element thereof longitudinally of the other element so as to move the fingers into or out of gripping contact with the film and a movable fulcrum for said feeder for varying the extent of throw of the feeder.

3. In a device of the class described, the combination of an oscillatory film feeder having relatively movable film gripping fingers, a rotary feeder-actuating cam engaging with said feeder and operating to positively oscillate the feeder and open and close the fingers upon the film, and a movable fulcrum for said feeder arranged to vary the extent of throw of the feeder.

4. In a device of the class described, the combination of a film feeder having film gripping fingers, mechanism for positively oscillating the feeder longitudinally of the film and opening and closing the fingers upon the film, a fulcrum for the feeder, a movable support for the fulcrum and an adjustment means for moving the support to change the position of the fulcrum relative to that of the feeder operating mechanism.

5. In a device of the class described, the combination of an oscillatory film feeder having film gripping fingers, a rotary cam engaging said feeder and operating to positively oscillate the feeder longitudinally of the film and to intermittently bring the fingers into gripping engagement with the film.

6. In a device of the class described, the combination of an oscillatory film feeder comprising an oscillatory and reciprocatory cam plate having film gripping fingers and an oscillatory arm guided upon the cam plate and having fingers coöperating with the first named fingers for gripping the film, and a rotary cam for positively oscillating the cam plate and arm longitudinally of the film and reciprocating the cam plate longitudinally of the arm.

7. In a device of the class described, the combination of an oscillatory feeder having relatively movable film gripping fingers, a rotary feeder-actuating cam in engagement with said feeder and operating to oscillate the feeder longitudinally of the film and to open and close the fingers upon the film, a fulcrum for the feeder, a support for the fulcrum and an adjustment device for moving said fulcrum with respect to the axis of rotation of the cam to vary the extent of the throw of the feeder.

8. In a device of the class described, the combination of an oscillatory feeder having relatively movable film gripping fingers, a rotary feeder-actuating cam in engagement with said feeder and operating to oscillate the feeder longitudinally of the film and to open and close the fingers upon the film, a movable fulcrum pin for the feeder, means for guiding the pin to move in a plane extending through the axis of rotation of the cam, an adjustment screw and connections between the adjustment screw and pin.

9. In a device of the class described, the combination of an oscillatory feeder having relatively movable film gripping fingers, a rotary feeder-actuating cam in engagement with said feeder and operating to oscillate the feeder longitudinally of the film and to open and close the fingers upon the film, a movable fulcrum pin for the feeder, a support for the pin and an adjustment mechanism for changing the position of the pin in a line extending radially of the axis of rotation of the cam.

10. In a device of the class described, the combination of an oscillatory feeder having relatively movable film gripping fingers, a rotary feeder-actuating cam in engagement with said feeder and operating to oscillate the feeder longitudinally of the film and to open and close the fingers upon the film, a movable fulcrum pin for the feeder, a support for the pin, a guide way extending transversely of the film in which said support is guided, and an adjustment device for said support arranged to vary the location of the fulcrum pin.

11. In a device of the class described, the combination of an oscillatory feeder having relatively movable film gripping fingers, a rotary feeder-actuating cam in engagement with said feeder and operating to oscillate the feeder longitudinally of the film and to open and close the fingers upon the film, a movable fulcrum pin for the feeder, a support for the pin, a guide for the support extending transversely of the film and an adjustment screw connected with the support.

12. In a device of the class described, the combination of an oscillatory feeder having relatively movable film gripping fingers, a rotary feeder-actuating cam in engagement with said feeder and operating to oscillate the feeder longitudinally of the film and to open and close the fingers upon the film, a movable fulcrum pin for the feeder, a support for the pin, a guide for the support extending transversely of the film, a link connected with the support and an adjustment screw threaded in said link.

13. In a device of the class described, the combination with a cam shaft, a feeder-operating cam thereon and an oscillatory cam plate supported by the cam and actuated thereby to move in lines approximately parallel with the film and transversely thereof, a fulcrum for the cam plate, film gripping fingers carried by said cam plate, an oscillating arm which is oscillated in unison with the cam plate and fingers thereon coöperating with the fingers on the cam plate to intermittently grasp the film between them.

14. In a device of the class described, the combination of a rotary cam shaft, a feeder-operating cam thereon, a cam plate actuated by said cam to move longitudinally of the film and transversely thereof and having film gripping fingers upon one end, a fulcrum pin for the cam plate, oscillatory arms having gripping fingers coöperating with fingers upon the cam plate to intermittently grasp the film and a connection between the cam plate and arm for causing them to oscillate in unison.

15. In a device of the class described, the combination with mechanism having a guiding channel and a light aperture on one side, and a projecting lens upon the opposite side, of film feeding mechanism for intermittently feeding a film through the channel and past the light aperture, and film guiding mechanism for guiding the film to the guiding channel and, including a continuously moving element, said guiding mechanism being arranged to form a loop in the film directed toward the lens side of the machine and away from the space between the light aperture and lens.

16. In a device of the class described, the combination with mechanism having a guiding channel and a light aperture on one side, and a projecting lens upon the opposite side, of film feeding mechanism for intermittently feeding a film through the channel and past the light aperture, and a set of film guiding rollers located above the light aperture, said set of guiding rollers including a continuously rotating feed roller and being arranged to feed the film to the guiding channel in the form of a loop directed toward the lens side of the machine and away from the space between the light aperture and lens.

17. In a device of the class described, the combination with mechanism having a guiding channel and a light aperture on one side, and a projecting lens on the opposite side, of film feeding mechanism for intermittently feeding a film through the channel and past the light aperture, guide rollers including a continuously rotated feed roller arranged to direct the film to the channel in the form of a loop which extends toward the lens side of the machine and away from the aperture, and gearing between the feeding mechanism and feed roller arranged to rotate said feed roller in a direction to feed the film forward and away from the space included directly between the light aperture and lens.

18. In a moving picture machine, the combination of a clutch for gripping a film to move it, a cam for positively moving the clutch in one direction when it grips the film and in the opposite direction when its grip on the film is released, means operatively connecting the clutch and cam, and means connected with the clutch and actuated by the cam for causing the clutch to grip the film, substantially as described.

19. In a moving picture machine, the combination of a clutch for gripping a film to move it, a cam for moving the clutch, and means connected with the clutch and located in the path of movement of said cam to be actuated by the cam to cause the clutch to grip the film, substantially as described.

20. In a moving picture machine, the combination of a clutch for gripping a film to move it, a cam for moving the clutch, means connected with the clutch and located in the path of movement of said cam to be actuated by the cam to cause the clutch to grip the film, and means for releasing the grip of the clutch on the film when the cam recedes from the clutch, substantially as described.

In witness whereof, I have hereunto subscribed the foregoing specification at Chicago, Cook county, Illinois, this 24th day of February A. D. 1909.

JOHN J. PINK.

Witnesses:
CHARLES O. SHERVEY,
FANNIE F. RICHARDS.